B. HOLT.
STEERING MECHANISM FOR TRACTION ENGINES, &c.
APPLICATION FILED JUNE 26, 1911.
1,111,961.
Patented Sept. 29, 1914.
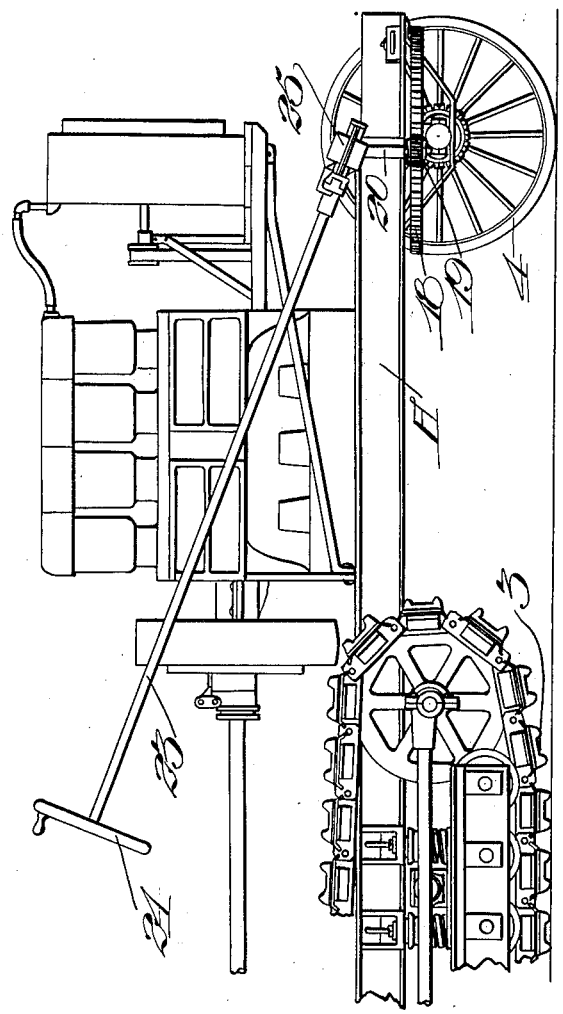

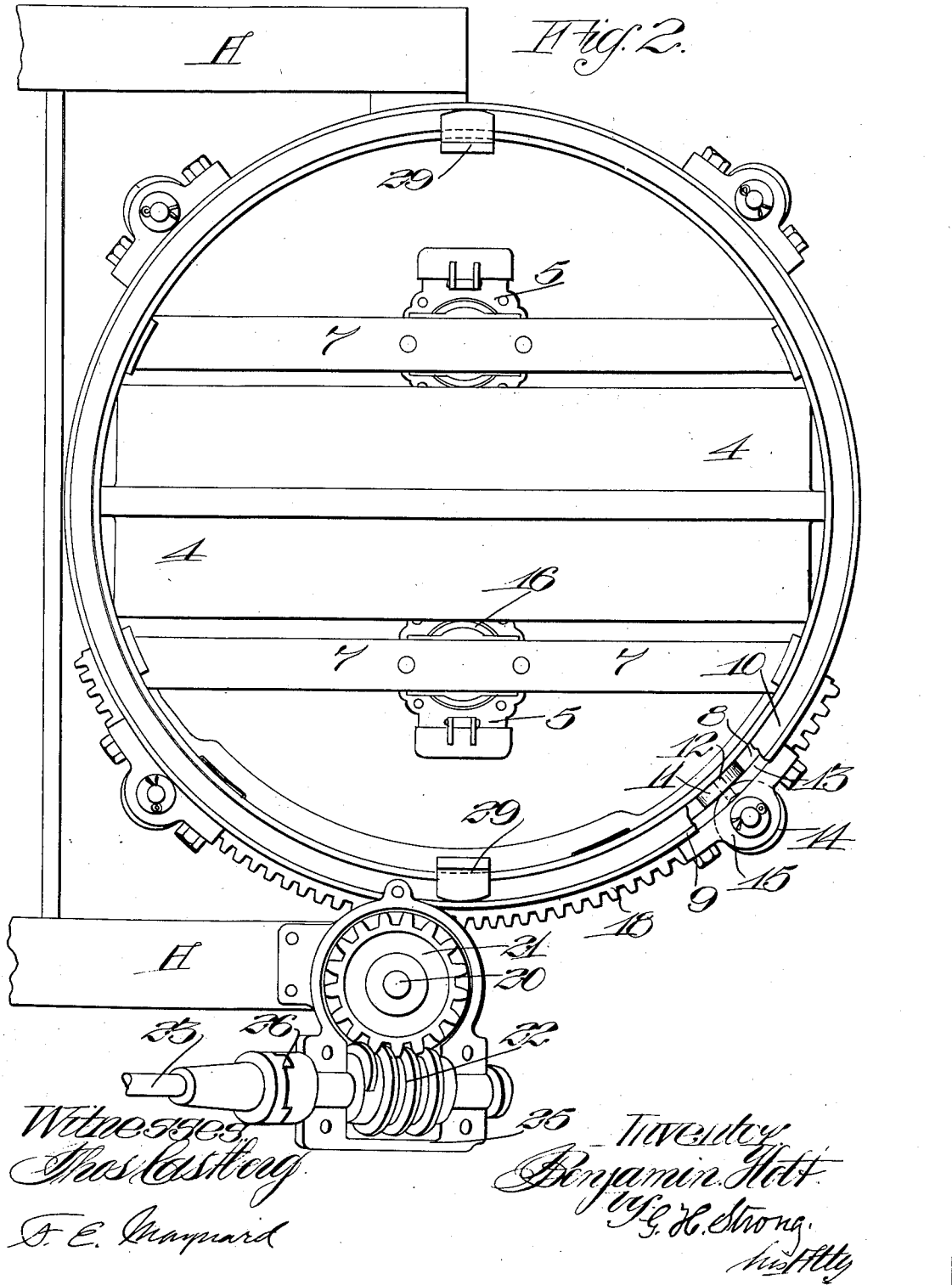

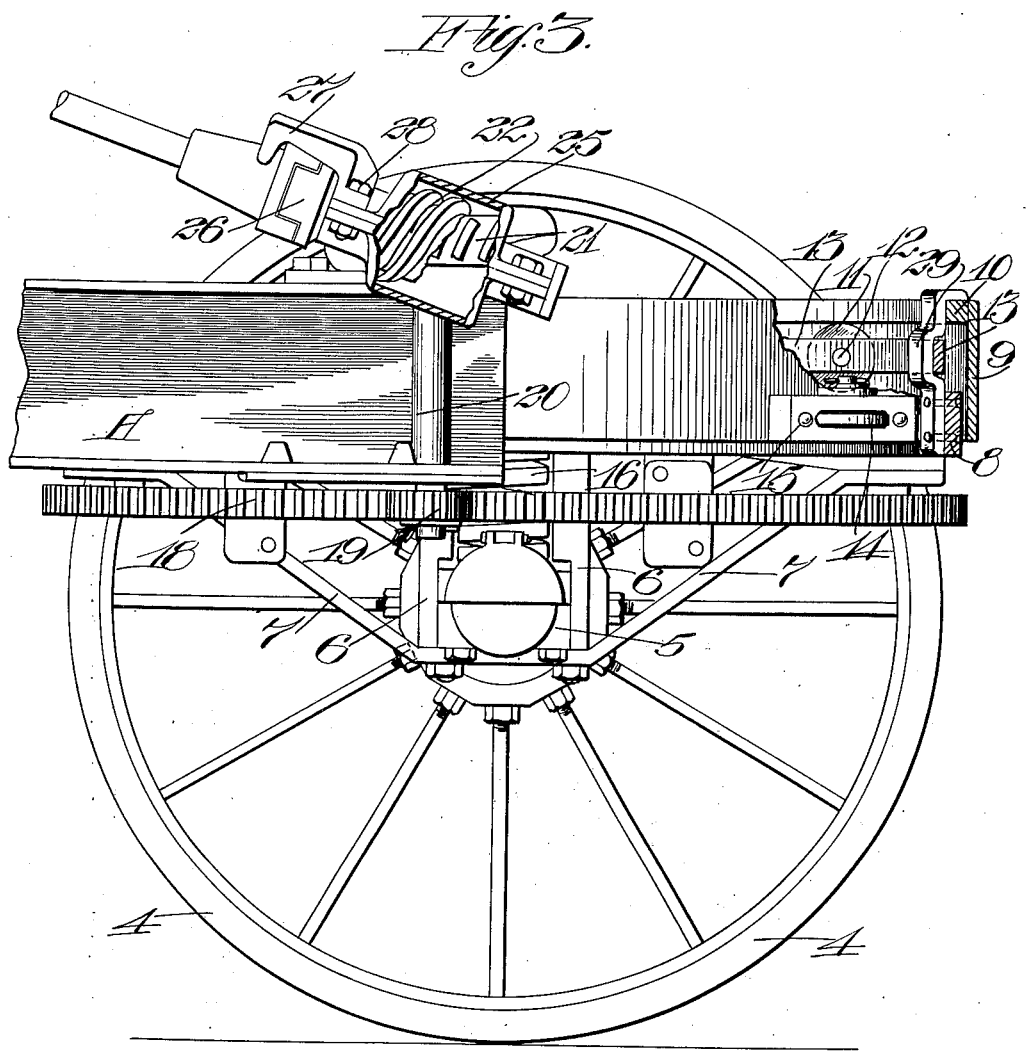

UNITED STATES PATENT OFFICE.

BENJAMIN HOLT, OF STOCKTON, CALIFORNIA.

STEERING MECHANISM FOR TRACTION-ENGINES, &c.

1,111,961.  Specification of Letters Patent.  Patented Sept. 29, 1914.

Application filed June 26, 1911. Serial No. 635,309.

*To all whom it may concern:*

Be it known that I, BENJAMIN HOLT, a citizen of the United States, residing at Stockton, in the county of San Joaquin and State of California, have invented new and useful Improvements in Steering Mechanism for Traction-Engines, &c., of which the following is a specification.

This invention relates to steering wheels and their operating means, which wheels are for use with traction engines and other heavy road vehicles.

The objects and advantages of the invention will be apparent hereinafter.

The invention consists of the parts and the combination and construction of parts as hereinafter more fully described and claimed, having reference to the accompanying drawings, in which—

Figure 1 is a side elevation of a traction engine partly broken away, showing the application of my invention. Fig. 2 is a plan view of the steering wheel. Fig. 3 is a side elevation of same partly broken away.

While I have shown the invention as applied especially to a traction engine of the "caterpillar" type, it will be manifest that the invention is applicable to other types of traction engines, as well as combined harvesters, auto trucks, and other heavy vehicles.

A represents the vehicle frame, here shown as comprising two main sills or I-beams, suitably connected and braced, supported at one end upon the tractors 3, and at the front end by the steering wheel 4.

The present invention pertains specially to the mounting of the front steering wheel 4 and the means for manipulating it so as to direct the travel of the vehicle. This wheel 4 has the boxes 5 in which the axle of the wheel turns, mounted in vertical guides 6 of the truss-form side chords 7; there being a pair of these chords 7, one on each side of the wheel, and fixed in a turntable ring 8, which supports the front end of the vehicle frame; the wheel being disposed diametrally of the turntable ring 8. The ring 8 is contained within a circular guide 9 carried between the front ends of the sills A, and rigidly secured thereto; this circular guide 9 having an inwardly projecting strong annular track flange 10, against the underside of which, rollers 11 are adapted to bear; these rollers 11 being turnable on horizontal pins 12, carried by a part or parts 13, which latter are integral with, or constructed as a fixed part of, the turntable ring 8. The rollers 11 thus provide an anti-friction bearing to support the weight of the vehicle, and in order to facilitate the easy turning of the wheel and turntable certain horizontal anti-friction rollers 14 may be disposed around the periphery of the guide 9 and adapted to bear against the outer surface of the turntable ring 8. These rollers 14 turn on vertical pivots mounted in suitable casings 15, which casings are bolted to the ring guide 9 and project through slots in the latter to bring them into tangential relationship to form anti-friction side supports with the ring 8.

In order to yieldingly support the front end of the vehicle on the wheel 4, springs 16 are disposed between the boxes 5 and horizontal top member of the chords 7, and between the vertical guides 6.

From the foregoing it will be seen that the wheel 4, turntable 8 and vertical rollers 11 all move together inside the annular guide 9, the turntable and wheel being maintained upright by the guide 9 and rollers 14, and the weight of the vehicle supported by means of the track 10 running on the rollers 11; and any shock due to the meeting of the wheel 4 with an obstacle being absorbed by the springs 16.

In order to steer this wheel handily from any suitable point on the vehicle there is provided the following means: Carried by and arranged on one side of the turntable ring 8 is a segmental rack 18, which is engaged by a pinion 19 mounted on the vertical shaft 20, which is journaled on the annular guide 9. The upper end of the shaft 20 carries a worm gear 21, engaged by a worm 22 on the steering rod 23, which latter runs back to a suitable point on the vehicle and is provided with a hand-wheel 24 wherewith the operator may guide the movements of the vehicle. The worm and gear may be suitably incased as shown at 25. The steering rod is preferably made readily detachable from the worm shaft, as shown at 26; the two being held together by a clamp lug 27. Removing the clamp lug 27 by taking out a bolt 28, permits the steering rod 23 to be readily disconnected from the worm.

When the parts are assembled, the wheel 4 may be turned in any direction by simple manipulation of the hand-wheel 24, the power from the latter being transferred through the rod 23, the worm 22, gear 21 and shaft 20 and gear 19 to the rack segment 18 on the turntable ring 8. This form of steering mechanism has been put to extensive practical use in connection with heavy vehicles of this sort; these vehicles often weighing many tons. By the means here employed there is practically no lost motion and the heaviest machine can be readily turned by an operator with a minimum expenditure of strength.

By the means employed for supporting the annular guide 9 and track 10 on the turntable ring 8 and arranging the rack and pinion in the manner shown, the entire wheel with its turntable which collectively constitute a steering truck, are readily removed from the vehicle by removing clips 29 and lifting up the front end of the vehicle frame; the entire truck thereby being withdrawn from any connection with the frame. Clips 29 are attached to the turntable in line parallel with the axis of the steering wheel, the upper end over-hanging the top of the track flange.

An important practical feature of this invention is making the worm gearing self-locking by setting the axis of the steering worm 22 oblique to the axis of the vertical gear 21; being the use of a skew gearing instead of the true worm gearing.

Referring to Fig. 3 it will be noted that the plane of the teeth on the worm gear 22 are in approximate parallelism with the axis of the gear 21. This reduces the leverage between the worm and the worm gear, to such an extent that the gear is unable to rotate the worm, which results in a dead lock when the operation of the steering is reversed. That is to say, the steering wheel is prevented from rotating the steering column; while the steering column has a free leverage for rotating the steering wheel. This is enlarged in the detail Fig. 2.

Having thus described my invention, what I claim and desire to secure by Letters Patent is—

1. In a steering mechanism for vehicles, the combination with the vehicle frame embodying a horizontal guide having a circular vertical wall with an inwardly projecting circular track flange at the top having its track face directed downwardly, a turntable ring located within the circular guide below the track flange, anti-friction rollers interposed between the said ring and flange and between the said ring and lower portion of the guide, a vertical steering wheel, located within the ring, bearings in which the steering wheel is journaled located below and supporting the ring and guide, a segmental rack rigid with the ring and located below the guide, a pinion journaled in the frame and meshing with the rack and a wheel for rotating the pinion.

2. In a vehicle steering mechanism, the combination with the vehicle frame embodying a horizontal guide having a circular vertical wall with an inwardly projecting circular track flange at the top having its track face directed downwardly, a turntable ring located within the circular guide below the track flange, anti-friction rollers interposed between the ring and track face of the flange and between the guide and outer face of the ring near the bottom thereof, two parallel chords rigid with and extending below the turntable ring, bearing boxes movable vertically in said chords, a vertical steering wheel journaled in said boxes, a segmental rack rigid with the turntable ring and located below the same and above the axis of the steering wheel, a pinion journaled on a fixed axis and meshing with the rack, and means for turning the pinion to steer the vehicle.

3. In a vehicle steering mechanism, the combination with the vehicle frame embodying a horizontal guide having a circular vertical wall with an inwardly projecting annular track flange at the top having its track face directed downwardly, a turntable ring located within the circular guide below the track flange, antifriction rollers interposed between the ring and track face of the flange and between the guide and outer face of the ring near the bottom thereof, oppositely disposed clips rigid with the turntable ring and having their upper ends extended over the track flange, a steering wheel journaled on a horizontal axis and located within the turntable ring, and means for turning said turntable ring and wheel horizontally with relation to the guide and vehicle frame, substantially as described.

In testimony whereof I have hereunto set my hand in the presence of two subscribing witnesses.

BENJAMIN HOLT.

Witnesses:
GEORGE COWELL,
R. E. MANN.